US011422258B2

(12) United States Patent
Thorpe et al.

(10) Patent No.: US 11,422,258 B2
(45) Date of Patent: Aug. 23, 2022

(54) FMCW LIDAR METHODS AND APPARATUSES INCLUDING EXAMPLES HAVING FEEDBACK LOOPS

(71) Applicant: Bridger Photonics, Inc., Bozeman, MT (US)

(72) Inventors: Michael James Thorpe, Bozeman, MT (US); Jason Kenneth Brasseur, Bozeman, MT (US); Peter Aaron Roos, Bozeman, MT (US); Nathan Joseph Greenfield, Bozeman, MT (US); Aaron Thomas Kreitinger, Bozeman, MT (US)

(73) Assignee: Bridger Photonics, Inc., Bozeman, MT (US)

( * ) Notice: Subject to any disclaimer, the term of this patent is extended or adjusted under 35 U.S.C. 154(b) by 415 days.

(21) Appl. No.: 16/494,207

(22) PCT Filed: Mar. 16, 2018

(86) PCT No.: PCT/US2018/023004
§ 371 (c)(1),
(2) Date: Sep. 13, 2019

(87) PCT Pub. No.: WO2018/170478
PCT Pub. Date: Sep. 20, 2018

(65) Prior Publication Data
US 2020/0011994 A1    Jan. 9, 2020

Related U.S. Application Data

(60) Provisional application No. 62/487,965, filed on Apr. 20, 2017, provisional application No. 62/472,415, filed on Mar. 16, 2017.

(51) Int. Cl.
*G01C 3/00*    (2006.01)
*G01S 17/34*   (2020.01)
(Continued)

(52) U.S. Cl.
CPC .............. *G01S 17/34* (2020.01); *G01S 7/497* (2013.01); *G01S 7/4911* (2013.01); *G01S 7/4912* (2013.01)

(58) Field of Classification Search
CPC ...... G01S 17/34; G01S 7/4911; G01S 7/4912; G01S 7/497
See application file for complete search history.

(56) References Cited

U.S. PATENT DOCUMENTS

| 3,925,666 A | 12/1975 | Allan et al. |
| 4,593,368 A | 6/1986 | Fridge et al. |

(Continued)

FOREIGN PATENT DOCUMENTS

| WO | 2010127151 A2 | 11/2010 |
| WO | 2014088650 A1 | 6/2014 |

(Continued)

OTHER PUBLICATIONS

U.S. Appl. No. 16/966,451 titled "Apparatuses and Methods for Gas Flux Measurements" filed Jul. 30, 2020.
(Continued)

*Primary Examiner* — Mark Hellner
(74) *Attorney, Agent, or Firm* — Dorsey & Whitney LLP

(57) ABSTRACT

Methods and apparatuses are described for frequency-modulated continuous-wave (FMCW) light detection and ranging (LiDAR). Examples are provided where high-closed-loop bandwidth, active feedback applied to laser frequency chirps may provide increases in the free-running laser coherence length for long-range FMCW distance measurements. Examples are provided that use an asymmetric sideband generator within an active feedback loop for higher closed-loop bandwidth. Examples of using a single shared reference interferometer within multiple active feedback loops that may be used for increasing the coherence length of multiple (Continued)

chirped lasers are described. Example calibrators are also described.

5 Claims, 10 Drawing Sheets

(51) Int. Cl.
  *G01S 7/4911* (2020.01)
  *G01S 7/4912* (2020.01)
  *G01S 7/497* (2006.01)

(56) References Cited

U.S. PATENT DOCUMENTS

| | | | |
|---|---|---|---|
| 4,795,253 A | 1/1989 | Sandridge et al. | |
| 4,830,486 A | 5/1989 | Goodwin | |
| 5,115,468 A | 5/1992 | Asahi et al. | |
| 5,294,075 A | 3/1994 | Vertatschitsch et al. | |
| 5,367,399 A | 11/1994 | Kramer | |
| 5,371,587 A | 12/1994 | De Groot et al. | |
| 5,534,993 A | 7/1996 | Ball et al. | |
| 5,548,402 A | 8/1996 | Nogiwa | |
| 5,768,001 A | 6/1998 | Kelley et al. | |
| 5,859,694 A | 1/1999 | Galtier et al. | |
| 6,034,976 A | 3/2000 | Mossberg et al. | |
| 6,516,014 B1 * | 2/2003 | Sellin | H01S 3/1303 372/18 |
| 6,822,742 B1 | 11/2004 | Kalayeh et al. | |
| 6,864,983 B2 | 3/2005 | Galle et al. | |
| 7,215,413 B2 | 5/2007 | Soreide et al. | |
| 7,292,347 B2 | 11/2007 | Tobiason et al. | |
| 7,511,824 B2 | 3/2009 | Sebastian et al. | |
| 7,742,152 B2 | 6/2010 | Hui et al. | |
| 7,920,272 B2 | 4/2011 | Sebastian et al. | |
| 8,010,300 B1 | 8/2011 | Stearns et al. | |
| 8,081,670 B2 * | 12/2011 | Belsley | G01S 7/484 372/12 |
| 8,121,798 B2 | 2/2012 | Lippert et al. | |
| 8,175,126 B2 | 5/2012 | Rakuljic et al. | |
| 8,294,899 B2 | 10/2012 | Wong | |
| 8,582,085 B2 | 11/2013 | Sebastian et al. | |
| 8,730,461 B2 | 5/2014 | Andreussi | |
| 8,781,755 B2 | 7/2014 | Wong | |
| 8,913,636 B2 | 12/2014 | Roos et al. | |
| 9,030,670 B2 | 5/2015 | Warden et al. | |
| 9,559,486 B2 | 1/2017 | Roos et al. | |
| 9,696,423 B2 | 7/2017 | Martin | |
| 9,759,597 B2 | 9/2017 | Wong | |
| 9,784,560 B2 | 10/2017 | Thorpe et al. | |
| 9,864,060 B2 | 1/2018 | Sebastian et al. | |
| 9,970,756 B2 | 5/2018 | Kreitinger et al. | |
| 10,247,538 B2 | 4/2019 | Roos et al. | |
| 2002/0071122 A1 | 6/2002 | Kulp et al. | |
| 2003/0043437 A1 | 3/2003 | Stough et al. | |
| 2004/0088113 A1 | 5/2004 | Spoonhower et al. | |
| 2004/0105087 A1 | 6/2004 | Gogolla et al. | |
| 2005/0078296 A1 | 4/2005 | Bonnet | |
| 2005/0094149 A1 | 5/2005 | Cannon | |
| 2006/0050270 A1 | 3/2006 | Elman | |
| 2006/0162428 A1 | 7/2006 | Hu et al. | |
| 2006/0203224 A1 * | 9/2006 | Sebastian | G01S 17/34 356/4.09 |
| 2008/0018881 A1 * | 1/2008 | Hui | G01S 7/4917 356/5.09 |
| 2008/0018901 A1 | 1/2008 | Groot | |
| 2009/0046295 A1 | 2/2009 | Kemp et al. | |
| 2009/0153872 A1 | 6/2009 | Sebastian et al. | |
| 2009/0257622 A1 | 10/2009 | Wolowelsky et al. | |
| 2010/0007547 A1 | 1/2010 | D'Addio | |
| 2010/0091278 A1 | 4/2010 | Liu et al. | |
| 2010/0131207 A1 | 5/2010 | Lippert et al. | |
| 2011/0069309 A1 | 3/2011 | Newbury et al. | |
| 2011/0164783 A1 | 7/2011 | Hays et al. | |
| 2011/0188029 A1 | 8/2011 | Schmitt et al. | |
| 2011/0205523 A1 | 8/2011 | Rezk et al. | |
| 2011/0213554 A1 | 9/2011 | Archibald et al. | |
| 2011/0273699 A1 | 11/2011 | Sebastian et al. | |
| 2011/0292403 A1 | 12/2011 | Jensen et al. | |
| 2012/0106579 A1 | 5/2012 | Roos et al. | |
| 2012/0274938 A1 | 11/2012 | Ray | |
| 2012/0293358 A1 | 11/2012 | Itoh | |
| 2013/0104661 A1 | 5/2013 | Klotz et al. | |
| 2014/0002639 A1 | 1/2014 | Cheben et al. | |
| 2014/0036252 A1 | 2/2014 | Amzajerdian et al. | |
| 2014/0139818 A1 | 5/2014 | Sebastian et al. | |
| 2014/0204363 A1 | 7/2014 | Slotwinski et al. | |
| 2015/0019160 A1 | 1/2015 | Thurner et al. | |
| 2015/0185313 A1 | 7/2015 | Zhu | |
| 2016/0123718 A1 | 5/2016 | Roos et al. | |
| 2016/0123720 A1 | 5/2016 | Thorpe et al. | |
| 2016/0202225 A1 | 7/2016 | Feng et al. | |
| 2016/0259038 A1 | 9/2016 | Retterath et al. | |
| 2016/0261091 A1 | 9/2016 | Santis et al. | |
| 2017/0097274 A1 | 4/2017 | Thorpe et al. | |
| 2017/0097302 A1 | 4/2017 | Kreitinger et al. | |
| 2017/0115218 A1 | 4/2017 | Huang et al. | |
| 2017/0131394 A1 | 5/2017 | Roger et al. | |
| 2017/0168161 A1 | 6/2017 | Shapira et al. | |
| 2017/0171397 A1 | 6/2017 | Mitsumori et al. | |
| 2017/0191898 A1 | 7/2017 | Rella et al. | |
| 2017/0343333 A1 | 11/2017 | Thorpe et al. | |
| 2018/0188369 A1 | 7/2018 | Sebastian et al. | |
| 2018/0216932 A1 | 8/2018 | Kreitinger et al. | |
| 2019/0170500 A1 | 6/2019 | Roos et al. | |
| 2019/0383596 A1 | 12/2019 | Thorpe et al. | |
| 2020/0149883 A1 | 5/2020 | Thorpe et al. | |
| 2021/0055180 A1 | 2/2021 | Thorpe et al. | |
| 2021/0190953 A1 | 6/2021 | Roos et al. | |

FOREIGN PATENT DOCUMENTS

| | | | |
|---|---|---|---|
| WO | 2016064897 A1 | 4/2016 | |
| WO | WO 2018067158 A1 * | 4/2018 | ............ G01S 7/4911 |
| WO | 2018170478 | 9/2018 | |
| WO | 2018170478 A1 | 9/2018 | |
| WO | 2019060901 A1 | 3/2019 | |
| WO | 2019070751 A1 | 4/2019 | |
| WO | 2019079448 A1 | 4/2019 | |
| WO | 2019099567 | 5/2019 | |

OTHER PUBLICATIONS

U.S. Appl. No. 17/399,106 titled "High-Sensitivity Gas-Mapping 3D Imagerand Method of Operation" filed Aug. 12, 2021.

International Search Report and Written Opinion dated Aug. 1, 2018 for PCT Application No. PCT/US2018/023004, 18 pgs..

Invitation to Pay Addition Fees for PCT Appl. No. PCT/US2018/023004 dated Jun. 4, 2018.

Amann, et al., ""Laser ranging: a critical review of usual techniques for distance measurement," Optical Engineering, vol. 40(1) pp. 10-19 (Jan. 2001)".

Barber, et al., ""Accuracy of Active Chirp Linearization for Broadband Frequency Modulated Continuous Wave Ladar," Applied Optics, vol. 49, No. 2, pp. 213-219 (Jan. 2010)".

Barker, , ""Performance enhancement of intensity-modulated laser rangefinders on natural surfaces"", SPIE vol. 5606, pp. 161-168 (Dec. 2004).

Baumann, et al., ""Speckle Phase Noise in Coherent Laser Ranging Fundamental Precision Limitations," Optical Letters, vol. 39. Issue 16, pp. 4776-4779 (Aug. 2014)".

Boashash, , ""Estimating and Interpreting the Instantaneous Frequency of a Signal-Part 2: Algorithms and Applications"", Proceedings of the IEEE, vol. 80, No. 4, pp. 540-568 (Apr. 1992).

Bomse, et al., ""Frequency modulation and wavelength modulation spectroscopies: comparison of experimental methods using a lead-salt diode laser"", Appl. Opt., 31, pp. 718-731 (Feb. 1992).

Choma, et al., ""Sensitivity Advantage of Swept Source and Fourier Domain Optical Coherence Tomography," Optical Express, vol. 11, No. 18, 2183 (Sep. 2003)".

(56) References Cited

OTHER PUBLICATIONS

Ciurylo, , ""Shapes of pressure- and Doppler-broadened spectral lines in the core and near wings"", Physical Review A, vol. 58 No. 2, pp. 1029-1039 (Aug. 1998).
Dharamsi, , "A theory of modulation spectroscopy with applications of higher harmonic detection", J. Phys. D: Appl. Phys 29, pp. 540-549 (June 1995; 1996) (Retrieved Jan. 16, 2017).
Emran, Bara J. et al., "Low-Altitude Aerial Methane Concentration Mapping", School of Engineering, The University of British Columbia, Aug. 10, 2017, pp. 1-12.
Fehr, et al., ""Compact Covariance Descriptors in 3D Point Clouds for Object Recognition"", 2012 IEEE International Conference on Robotics and Automation, pp. 1793-1798, (May 2012).
Fransson, Karin et al., "Measurements of VOCs at Refineries Using the Solar Occultation Flux Technique", Department of Radio and Space Science, Chalmers University of Technology, 2002, 1-19.
Fujima, et al., ""High-resolution distance meter using optical intensity modulation at 28 GHz"", Meas. Sci. Technol. 9, pp. 1049-1052 (May 1998).
Gilbert, et al., ""Hydrogen Cyanide H13C14N Absorption Reference for 1530 nm to 1565 nm Wavelength Calibration—SRM 2519a"", NIST Special Publication 260-137 2005 ED, 29 pages, (Aug. 2005).
Iiyama, et al., "Linearizing Optical Frequency-Sweep of a Laser Diode for FMCW Reflectrometry", Iiyama et al. Journal of Lightwave Technology, vol. 14, No. 2, Feb. 1996.
Iseki, et al., "A Compact Remote Methane Sensor using a Tunable Diode Laser", Meas. Sci. Technol., 11, 594, pp. 217-220 (Jun. 2000).
Jia-Nian, et al., ""Etalon effects analysis in tunable diode laser absorption spectroscopy gas concentration detection system based on wavelength modulation spectroscopy"", IEEE SOPO, pp. 1-5 (Jul. 2010).
Johnson, et al., ""Using Spin-Images for Efficient Object Recognition in Cluttered 3D Scenes"", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al, Applied Optics, vol. 38, No. 15, May 20, 1999, pp. 3376-3386.
Karmacharya, et al., ""Knowledge guided object detection and indentification in 3D point clouds"", SPIE 9528, 952804-952804-13 (Jun. 2015).
Lenz, Dawn et al., "Flight Testing of an Advanced Airborne Natural Gas Leak Detection System", ITT Industries Space Systems Division, Oct. 2005, all.
Lu, et al., "Differential wavelength-scanning heterodyne interferometer for measuring large step height", Applied Optics, vol. 41, No. 28, Oct. 1, 2002.
Masiyano, et al., ""Use of diffuse reflections in tunable diode laser absorption spectroscopy: implications of laser speckle for gas absorption measurements"", Appl. Phys. B 90, pp. 279-288 (Feb. 2008).
Mather, T.A. et al., "A reassessment of current volcanic emissions from the Central American arc with specific examples from Nicaragua", Journal of Volcanology and Geothermal Research, Nov. 2004, 297-311.
Ngo, et al., ""An isolated line-shape model to go beyond the Voigt profile in spectroscopic databases and radiative transfer codes"", Journal of Quantitative Spectroscopy and Radiative Transfer, 129, pp. 89-100 ( Nov. 2013).
Olsovsky, et al., ""Chromatic Confocal Microscopy for Multi-depth Imaging of Epithelial Tissue," Biomedical Optics Express, vol. 4, No. 5, pp. 732-740 (May 2013)".

Paffenholz, , ""Direct geo-referencing of 3D point clouds with 3D positioning sensors"", (Doctoral Thesis), Leibniz Universität Hannover, 138 pages (Sep. 2012).
Polyanksy, et al., ""High-Accuracy CO2 Line Intensities Determined from Theory and Experiment"", Physical Review Letters, 114, 5 pages (Jun. 2015).
Rao, , ""Information and the accuracy attainable in the estimatin of statistical parameters"", Bull. Calcutta Math. Soc., 37,pp. 81-89 (1945, reprinted 1992) (Retrieved Jan. 10, 2017).
Riris, et al., ""Airborne measurements of atmospheric methane column abundance using a pulsed integrated-path differential absorption lidar"", Applied Optics, vol. 51, No. 34, pp. 8296-8305 (Dec. 2012).
Roos, et al., ""Ultrabroadband optical chirp linearization for precision metrology application"", Optics Letters, vol. 34 No. 23, pp. 3692-3694 (De. 2009).
Roos, et al., "Ultrabroadband optical chirp linearization for precision metrology applications", Optics Letters, vol. 34, Issue 23, pp. 3692-3694 (2009).
Rothman, et al., ""The HITRAN 2008 molecular spectroscopic database"", Journal of Quantitative Spectroscopy & Radiative Transfer, 110, pp. 533-572 (Jul. 2009).
Rusu, et al., ""Fast Point Feature Histograms (FPFH) for 3D Registration"", IEEE Int. Conf. Robot., pp. 3212-3217 (May 2009).
Sandsten, et al., ""vol. flow calculations on gas leaks imaged with infrared gas-correlation"", Optics Express, vol. 20, No. 18, pp. 20318-20329 (Aug. 2012).
Sheen, et al., "Frequency Modulation Spectroscopy Modeling for Remote Chemical Detection." PNNL 13324 (Sep. 2000).
Sheen, , ""Frequency Modulation Spectroscopy Modeling for Remote Chemical Detection"", PNNL 13324, 51 pages (Sep. 2000).
Silver, , ""Frequency-modulation spectroscopy for trace species detection: theory and comparison among experimental methods"", Appl. Opt., vol. 31 No. 6, pp. 707-717 (Feb. 1992).
Sirat, et al., ""Conoscopic Holography," Optics Letters, vol. 10, No. 1 (Jan. 1985)".
Sivananthan, , Integrated Linewidth Reduction of Rapidly Tunable Semiconductor Lasers Sivananthan, Abirami, Ph.D., University of California, Santa Barbara, 2013, 206; 3602218.
Stone, et al., ""Performance Analysis of Next-Generation LADAR for Manufacturing, Construction, and Mobility," NISTIR 7117 (May 2004)".
Thoma, Eben D. et al., "Open-Path Tunable Diode Laser Absorption Spectroscopy for Acquisition of Fugitive Emission Flux Data", Journal of the Air & Waste Management Association (vol. 55), Mar. 1, 2012, 658-668.
Twynstra, et al., ""Laser-absorption tomography beam arrangement optimization using resolution matrices"", Applied Optics, vol. 51, No. 29, pp. 7059-7068 (Oct. 2012).
Xi, et al., "Generic real-time uniorm K-space sampling method for highspeed swept-Source optical cohernece tomography", Optics Express, vol. 18, No. 9, pp. 9511-9517 (Apr. 2010).
Zakrevskyy, et al., ""Quantitative calibration- and reference-free wavelength modulation spectroscopy"", Infrared Physics & Technology, 55, pp. 183-190 (Mar. 2012),.
Zhao, et al., ""Calibration-free wavelength-modulation spectroscopy based on a swiftly determined wavelength-modulation frequency response function of a DFB laser"", Opt. Exp., vol. 24 No. 2, pp. 1723-1733 (Jan. 2016).
Zhao, Yanzeng et al., "Lidar Measurement of Ammonia Concentrations and Fluxes in a Plume from a Point Source", Cooperative Institute for Research in Environmental Studies, University of Colorado/NOAA (vol. 19), Jan. 2002, 1928-1938.

\* cited by examiner

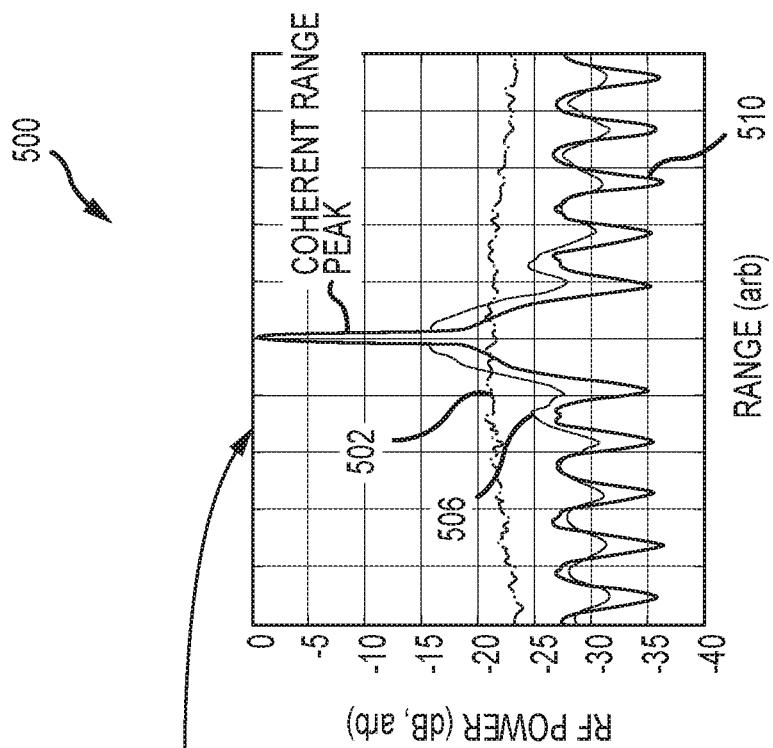
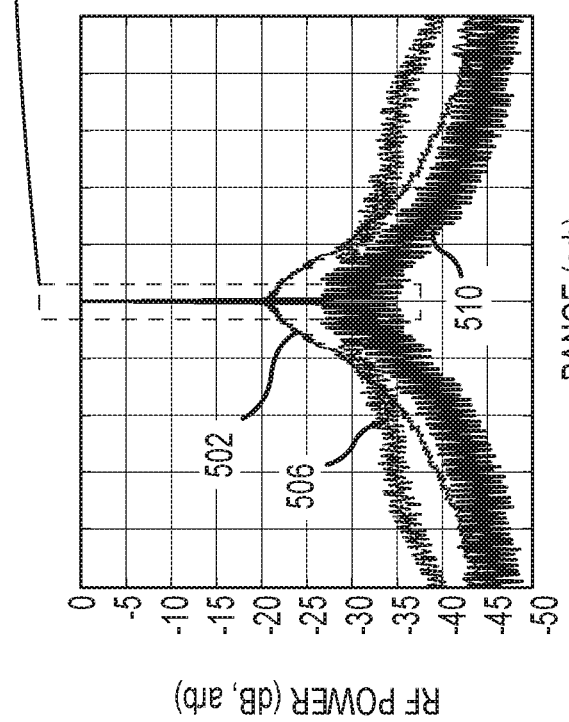
FIG.5b
FIG.5a

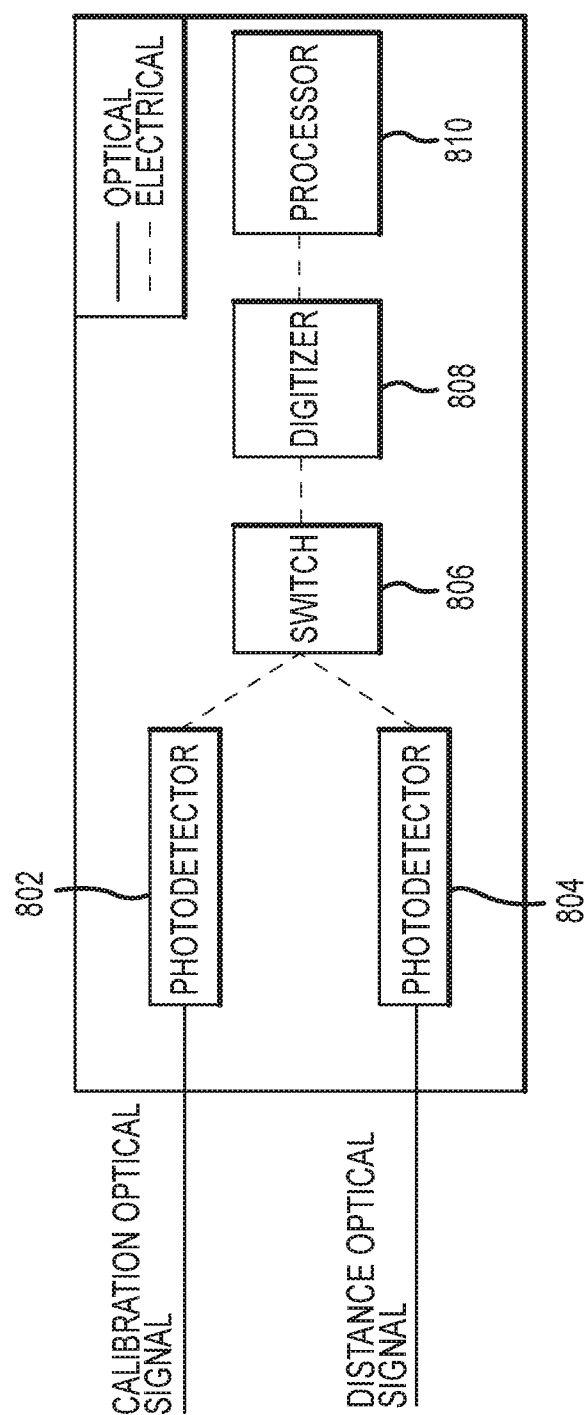

FMCW LIDAR METHODS AND APPARATUSES INCLUDING EXAMPLES HAVING FEEDBACK LOOPS

CROSS-REFERENCE TO RELATED APPLICATION(S)

This application is a U.S. National Stage filing under 35 U.S.C. § 371 of PCT Application No PCT/US2018/023004, filed Mar. 16, 2018, which claims the benefit under 35 U.S.C. § 119 (e) of the earlier tiling dates of U.S. Application Serial No. 62/472,415, filed Mar. 16, 2017, and U.S. Application Ser. No. 62/487,965, filed Apr. 20, 2017, The entire contents of the afore-mentioned priority applications are hereby incorporated by reference, in their entirety, and for any purposes.

TECHNICAL FIELD

Examples described herein relate to light detection and ranging (LiDAR) systems and methods, such as frequency-modulated continuous-wave (FMCW) LiDAR systems and methods. Examples of feedback loops, calibrators, and other optional features of LiDAR systems are described.

BACKGROUND

FMCW LiDAR systems may be used to measure distances to a target. These systems may have difficulty achieving the speed, measurement range, resolution, precision, and/or accuracy which may be desired in a particular application.

SUMMARY

Examples of methods are described herein. An example method may include applying an actuator signal to a laser source to provide a laser beam having a frequency and a free-running coherence length, and controlling the actuator signal using a feedback loop to control a chirp of the frequency of the laser beam. The feedback loop may have a closed-loop bandwidth selected to cause the laser beam to have an actual coherence length longer than the free-running coherence length.

In some examples, controlling the actuator signal includes controlling the actuator signal to chirp the frequency of the laser beam linearly.

In some examples, the feedback loop includes splitting the laser beam into at least two optical paths and generating an interference signal based on the at least two optical paths.

In some examples, the actual coherence length is greater than a coherence length determined by a Schawlow Townes linewidth limit of the laser source.

In some examples, the closed-loop bandwidth is greater than a free-running laser linewidth of the laser beam divided by 10.

In some examples, the feedback loop includes splitting the laser beam into at least two optical paths and generating an interference signal based on the at least two optical paths. Controlling the actuator signal may include controlling the actuator signal to chirp the frequency at a chirp rate, and the closed-loop bandwidth may be greater than one tenth of a product of the chirp rate and a difference between transit times of the at least two optical paths.

An example method may include generating, from a first laser source, a first laser beam having a first frequency, generating, from a second laser source, a second laser beam having a second frequency, chirping the first frequency at a first chirp rate, chirping the second frequency at a second chirp rate, directing a portion of the first laser beam into a reference interferometer to form a first interference signal, directing a portion of the second laser beam into the reference interferometer to form a second interference signal, using the first interference signal in a first feedback loop to control the first frequency, and using the second interference signal in a second feedback loop to control the second frequency.

In some examples, the reference interferometer includes a Mach Zender interferometer, and directing the portion of the first laser beam and directing the portion of the second laser beam into the reference interferometer includes counter-propagating the portion of the first laser beam and the portion of the second laser beam through the reference interferometer.

An example method may include generating, from a laser source, a laser beam having a frequency, chirping the frequency at a chirp rate, splitting the laser beam into a plurality of optical paths, modulating, with an asymmetric-sideband generator, an optical path of the plurality of optical paths to form a modulated optical path, directing the modulated optical path and at least one other optical path of the plurality of optical paths onto a detector to form an interference signs, and using the interference signal in a feedback loop to actuate the frequency or a phase of the laser beam.

In some examples, the asymmetric-sideband generator includes a photonic integrated circuit element.

In some examples, the asymmetric-sideband generator includes a phase modulator section or phase-tuning diode section.

In some examples, the asymmetric-sideband generator includes an amplitude modulator, a phase modulator, or combinations thereof.

Examples of apparatuses are described herein. An example apparatus may include a laser source configured to provide a laser beam having a frequency, a frequency actuator configured to chirp the frequency, a plurality of reflective surfaces configured to reflect respective portions of the laser beam, a spacer configured to spatially separate the plurality of reflective surfaces, the spacer at least partially defining a hollow portion configured to allow the laser beam to pass between the plurality of reflective surfaces, a vent in fluid communication with the hollow portion configured to equilibrate a pressure within the hollow portion and a pressure external to the spacer, and a detector configured to receive portions of the laser beam reflected from the plurality of reflective surfaces.

In some examples, the spacer includes a material having a low coefficient of thermal expansion.

In some examples, the apparatus may include a temperature gauge, a pressure gauge, a humidity gauge, or combinations thereof.

BRIEF DESCRIPTION OF THE DRAWINGS

FIG. 5A and FIG. 5B are example range profiles from a linearly chirped laser arranged in accordance with examples described herein.

FIG. 8 is a schematic illustration of detectors and signal processors arranged in accordance with examples described herein.

DETAILED DESCRIPTION

Figure 1:
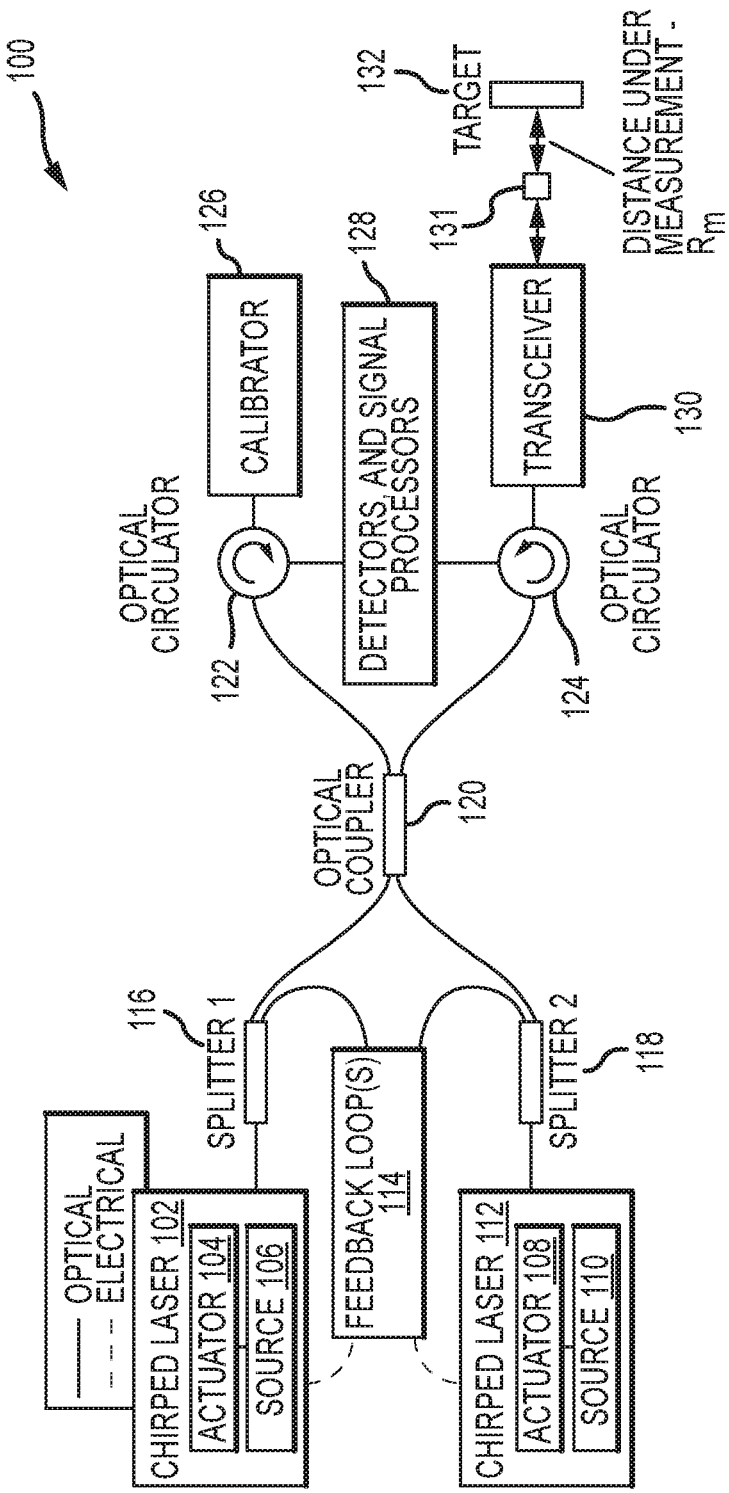
FIG. 1 is a schematic illustration of a system arranged in accordance with examples described herein.

Certain details are set forth herein to provide an understanding of described embodiments of technology. However, other examples may be practiced without various of these particular details. In some instances, well-known circuits, control signals, timing protocols, laser components, and/or software operations have not been shown in detail in order to avoid unnecessarily obscuring the described embodiments. Other embodiments may be utilized, and other changes may be made, without departing from the spirit or scope of the subject matter presented here.

Example methods and apparatuses are described herein that may facilitate frequency-modulated continuous-wave (FMCW) light detection and ranging (LiDAR). Examples described herein may be utilized in any number of applications, such as but not limited to, metrology (e.g., large-volume metrology), automotive LiDAR, and/or other applications where distance measurements may be desired. Examples are provided where high-closed-loop bandwidth, active feedback applied to laser frequency chirps may be used to increase a laser coherence length used for FMCW distance measurements to an actual coherence length that is greater than a free-running coherence length. Examples are provided that include the use of an asymmetric sideband generator and photonic integrated circuit elements within an active feedback loop that may facilitate such higher closed-loop bandwidth in some examples. Examples of using a single shared reference interferometer within multiple active feedback loops that may be used for increasing the coherence length of multiple chirped lasers are described and which may reduce the number of components used. An example apparatus is described of a calibrated reference length that may facilitate high accuracy distance measurements.

Frequency-modulated continuous-wave (FMCW) light ranging and detection (LiDAR) or laser radar (ladar) is a form of coherent laser distance measurement (the term "distance" may be used synonymously with the term "range" or "length" herein) that may use frequency modulation of a laser output (e.g., substantially linear frequency modulation), which is referred to as a form of frequency 'chirp', to achieve distance measurements. FMCW LiDAR can offer several benefits for high-precision, non-contact distance metrology that may make it an attractive solution for many metrology applications. FMCW LiDAR may use optical heterodyne detection, which can provide quantum-noise-limited measurement signals, and allow measurements with a large dynamic range of signal powers due the square root dependence of the FMCW signal on the scattered optical power received from the target (the term "target" may be used synonymously with the term "object" or "surface"). If desired, direct modulation of the laser output frequency can result in large chirp bandwidths, and therefore, high-resolution distance measurements due to the well-known relationship, $\Delta R = c/2B$, where $\Delta R$ is the range resolution, c is the speed of light and B is the chirp bandwidth. Chirped sideband modulation using an RF chirp applied to, for instance, an optical modulator, is also possible. Production of linear laser frequency chirps can lead, in some instances, to the achievement of Cramer-Rao-limited distance measurement precisions ($\sigma \approx \Delta R/\sqrt{SNR}$, where SNR is the RF power signal-to-noise ratio of the range measurement).

Along with the benefits of FMCW LiDAR, there are also challenges. For example, even for perfectly linear laser frequency chirps, the rise of incoherent sidelobes with increasing range, which may result from a limited laser coherence length, may lead to inadequate range resolution or inadequate signal-to-noise ratio (SNR) for longer range applications. There is also a need for reducing the cost and complexity of FMCW LiDAR systems and for robust and stable length references to enable improved distance measurement accuracy.

Examples disclosed herein may in some examples facilitate FMCW LiDAR. Examples are provided where high-closed-loop bandwidth, active feedback applied to laser frequency chirps may increase the laser coherence length for FMCW distance measurements in some examples. Closed-loop bandwidth may refer to a feedback frequency above which noise is no longer acceptably suppressed by the feedback signal. This feedback frequency may correspond to a frequency for which a phase of the feedback loop gain exceeds 135° relative negative feedback. Other phase thresholds may be used in other examples. Examples are provided that may include the use of an asymmetric sideband generator and photonic integrated circuit elements within an active feedback loop that may facilitate such higher closed-loop bandwidth in some examples. Examples of using a single shared reference interferometer within multiple active feedback loops are described that may be used for increasing the coherence length of multiple chirped lasers are described and which may reduce the number of components used. An example apparatus is described of a calibrated reference length that may facilitate high accuracy distance measurements.

FIG. 1 is a schematic illustration of a system arranged in accordance with examples described herein. The system 100 may include chirped laser 102, chirped laser 112, components for feedback loop(s) 114, splitter 116, splitter 118, coupler 120, circulator 122, circulator 124, calibrator 126, detectors and signal processors 128, transceiver 130, partial reflector 131 and target 132. The chirped laser 102 may include actuator 104 and source 106. The chirped laser 112 may include actuator 108 and source 110. Additional, fewer, and/or different components may be used in other examples.

In the example of FIG. 1, optical connections between elements are indicated with a solid line while electrical connections between elements are indicated with a dotted line. The chirped laser 102 may include actuator 104 coupled to laser source 106. The actuator 104 may be used to control a frequency or other parameter of the laser source 106—e.g., to chirp and/or provide corrections to a frequency of the laser source 106. The chirped laser 102 is positioned to provide a laser beam to splitter 116. The splitter 116 may provide a portion of the incident laser beam to the coupler 120 and a portion to one or more feedback loop(s) 114. The chirped laser 112 may include actuator 108 coupled to laser source 110. The actuator 108 may be used to control a frequency or other parameter of the laser source 110—e.g., to chirp and/or provide corrections to a frequency of the laser source 110. The chirped laser 112 is positioned to provide a laser beam to splitter 118. The splitter 118 may provide a portion of the incident laser beam to the coupler 120 and a portion to one or more feedback loop(s) 114. The feedback loop(s) 114 may include optical and/or electrical components that may provide one or more feedback signals (e.g., actuator signals) to the actuator 104 and/or actuator 108 to control the frequency and/or other parameters of the laser beams provided by the chirped laser 102 and/or chirped laser 112. The feedback signals may be based on the output of the chirped laser 102 and/or chirped laser 112.

The coupler 120 may combine the incident laser beams received from splitter 116 and splitter 118. The coupler 120 may split the combined beam into a portion directed toward circulator 122 and a portion directed toward circulator 124. The circulator 122 may be coupled to calibrator 126 and detectors and signal processors 128. Accordingly, a first portion of the output from the coupler 120 may be directed through circulator 122 to calibrator 126. The circulator 124 may be coupled to detectors and signal processors 128 and transceiver 130. The transceiver 130 may direct a laser beam through partial reflector 131 at target 132. The distance between partial reflector 131 and the target 132 may be measured based on interference between a beam reflected from the partial reflector 131 and a beam reflected from the target 132.

Systems described herein, such as system 100, may be an FMCW LiDAR system. While a particular arrangement of components is shown in FIG. 1, other arrangements may also be used.

Examples of chirped lasers described herein, such as chirped laser 102 and/or chirped laser 112 of FIG. 1, may provide frequency modulation of a laser output (e.g., a laser beam). The frequency modulation may be linear in some examples (e.g., a linear chirp). The laser frequency may be directly chirped via a frequency actuator within the laser, or the frequency chirp may be imparted to the laser frequency by a modulator that may be external to the laser, or the frequency chirp may be generated in any other fashion. Generally, an actuator, such as actuator 104 and/or actuator 108 of FIG. 1 may be used to modulate or otherwise adjust a frequency of a laser source (e.g., laser source 106 and/or laser source 110 of FIG. 1). Any chirp rate may be used. In some examples, chirp rates of $10^{14}$ Hz/second may be used.

Examples of systems described herein may utilize any number of chirped lasers. For example, two chirped lasers are shown in the example of FIG. 1. In other examples, other numbers of chirped lasers may be used. Certain of the chirped lasers may have different frequencies and/or chirp rates. In some examples, certain of the chirped lasers may have a same frequency and/or chirp rate. The chirped laser 102 and the chirped laser 112 of FIG. 1 may have different frequencies and/or chirp rates.

Chirped lasers described herein, such as chirped laser 102 and chirped laser 112 of FIG. 1, may include one or more actuators (e.g., actuator 104 and actuator 108) of FIG. 1 and one or more laser sources (e.g., source 106 and source 110 of FIG. 1). The laser sources may be implemented using generally any laser source. Laser sources generally produce coherent light having a frequency that is often in the optical or infrared portion of the electromagnetic spectrum. Examples of laser sources which may be used include, but are not limited to, semiconductor, optically pumped semiconductor, and solid state laser sources. Laser sources described herein may provide laser beams having a frequency—while any frequencies may be used, in some examples, frequencies in the optical or infrared range may be used. Laser sources described herein may provide laser beams having a free-running coherence length. Coherence length generally refers to a distance over which a coherent wave (e.g., a laser beam) may retain a threshold degree of coherence. Free-running coherence length generally refers to the coherence length of a laser beam produced by a laser source in the absence of chirping and in the absence of an active feedback loop as described herein. Actuators described herein may be utilized to control a parameter of the laser source (e.g., a phase and/or frequency of the laser source). Examples of actuators may include, but are not limited to, circuitry to control current provided to the laser source (e.g., laser injection current), or a mechanism to change the laser cavity length. Other actuators may additionally or instead be used. Actuators may be internal or external to and/or external to laser sources described herein. Each chirped laser (e.g., each laser source) may have any number of associated actuators, including 1, 2, 3, or another number of actuators.

Examples of systems described herein may include one or more splitters, such as the splitter 116 and splitter 118 of FIG. 1. The splitter 116 may be used to split a laser beam from chirped laser 102 into a portion provided for use in illuminating a target (e.g., provided to the coupler 120 of FIG. 1) and a portion provided for use in a feedback loop (e.g., provided to feedback loop(s) 114) to control the chirped laser 102. The splitter 118 may be used to split a laser beam from chirped laser 112 into a portion provided for use in illuminating a target (e.g., provided to coupler 120 of FIG. 1) and a portion provided for use in a feedback loop (e.g., provided to feedback loop(s) 114) to control the chirped laser 112. Generally, any beamsplitter may be used to implement splitters described herein. Beamsplitters may generally be implemented using one or more optical components that may reflect or otherwise couple a portion of a laser beam incident on the beamsplitter into a first path and transmit another potion of the laser beam incident on the beamsplitter into a second path. In some examples, polarizing beamsplitters may be used.

Examples of systems described herein may include one or more feedback loops, such as those including components of feedback loop(s) 114 of FIG. 1. For example, one feedback loop may be provided for each chirped laser. The feedback loops may in some example share one or more components, such as a reference interferometer as described herein. Generally, the feedback loops may be used to generate an electronic signal (e.g., an actuator signal) based on an optical output of a laser described herein. The electronic signal may be provided to one or more actuators (e.g., the actuator 104 and/or actuator 108 of FIG. 1) to control a laser source (e.g., source 106 and/or source 110) to provide a chirped laser output described herein. In some examples, the electronic signal is provided to provide a linear chirp for a chirped laser (e.g., the frequency of the chirped laser may increase and/or decrease linearly).

In this manner, one or more feedback loops described herein may be used to wholly and/or partially compensate for a non-linear response of the laser source responsive to an actuator signal. For example, a laser source may have a nonlinear optical frequency response to an actuator signal such as a laser injection current. The feedback loop may be used to compensate for the nonlinear optical frequency response and provide a linear chirp from a chirped laser described herein. Each feedback loop (or combinations of feedback loops) may have a closed-loop bandwidth. Examples of feedback loops described herein may have a closed-loop bandwidth such that a coherence length of a chirped laser controlled by the feedback loop may be increased to an actual coherence length that is greater than a free-running coherence length.

While a portion of the laser beam generated by chirped lasers described herein may be used in a feedback loop, another portion may be provided for use in interrogating (e.g., illuminating) a target. For example, the splitter 116 and splitter 118 of FIG. 1 each provide a portion of their respective incident laser beams to coupler 120. Generally, splitters may split incident light in any fractional portion. For example, the splitter 116 and splitter 118 of FIG. 1 may in some examples provide about 10 percent of incident energy to a feedback loop and 90 percent for use in interrogating a target. Other fractional splits may be possible in other examples (e.g., 5 percent to the feedback loop and 95 percent for interrogating the target in some examples, 15 percent to the feedback loop and 85 percent for interrogating the target in some examples). Couplers described herein, such as coupler 120 of FIG. 1 generally function to combine incident laser beams. Couplers described herein may be implemented using polarization-dependent or polarization-independent beam combiners. Couplers described herein may further split the combined beam into output portions. For example, the coupler 120 may provide a first output beam to calibrator 126 through circulator 122. The coupler 120 may provide a second output beam to transceiver 130 through circulator 124.

Optical circulators described herein, such as circulator 122 and circulator 124 of FIG. 1 may be polarization-dependent or polarization independent. An optical circulator may provide different outputs such that an input beam may be provided to a first output, and any beam reflected from the first output may be provided to a second output. For example, the circulator 122 of FIG. 1 may provide an output to the calibrator 126 based on an input from the coupler 120. The circulator 122 may provide a beam to detectors and signal processors 128 based on a reflected beam from the calibrator 126. In an analogous manner, the circulator 124 may provide an output beam to the transceiver 130 based on an input beam from the coupler 120. The circulator 124 may provide an output to detectors and signal processors 128 based on reflection (e.g., reflected or scattered in whole or in part) from a partial reflector 131 and a target 132.

Examples of calibrators described herein, such as calibrator 126 of FIG. 1 may include a reference. In some examples, the reference may be a stable reference length and/or atomic/molecular transition from which a distance to a target may be calibrated. Other references may be used in other examples and other measurements may be calibrated. Calibrators may receive a laser beam based on an output of chirped lasers described herein (e.g., from coupler 120 of FIG. 1). The calibrator may provide a laser beam output to one or more detectors and/or signal processors (e.g., to detectors and signal processors 128 through circulator 122 in the example of FIG. 1).

One or more detectors and/or signal processors may be provided in systems described herein, such as detectors and signal processors 128 of FIG. 1. The detectors and/or signal processors may include one or more optical detectors, and one or more signal processors (e.g., circuitry, filters, central processing units (CPUs), digital signal processors (DSPs), application specific integrated circuits (ASICs) and/or other processing elements). The detectors and signal processors 128 may be used to provide a reference signal (e.g., a reference length interference signal) based on one or more laser beams provided by the calibrator 126. Generally, a reference length interference signal may be generated by reflections e.g., two reflections) in a calibrator, the separation of which may define a reference length.

Examples of systems described herein may include one or more transceivers, such as transceiver 130 of FIG. 1. A transceiver may direct an output laser beam through a reflector 131 and toward a target 132 to interrogate (e.g., illuminate) the target. The laser beam output by the transceiver toward the target may be based on the output of the chirped lasers (e.g., chirped laser 102 and chirped laser 112 of FIG. 1). The transceiver may be stationary in some examples and may be mobile in some examples. The transceiver may include a beam scanner or other component(s) to spatially scan a laser beam. The transceiver may provide a portion of an incident beam as an output directed toward a partial reflector and a target. For example, the transceiver 130 of FIG. 1 may provide a portion of the laser beam received from circulator 124 to partial reflector 131 and the target 132. Examples of systems described herein may include one or more partial reflectors, such as partial reflector 131 of FIG. 1. The partial reflector may reflect a portion of the laser beam received from the transceiver back to other components of the system (e.g., circulator 124), which portion may be referred to as a local oscillator. The partial reflector may alternatively be placed within or prior to the transceiver. The target may reflect a portion of the laser beam received from the transceiver back to circulator 124, which portion may be referred to as a return. Laser right returning from the partial reflector and from the target to circulator 124 may be provided by circulator 124 to one or more detectors and signal processors (e.g., detectors and signal processors 128) to produce an interference signal related to a property of the target (e.g., a distance to the target).

Detectors and signal processors described herein, such as detectors and signal processors 128 of FIG. 1 may accordingly be used to provide two interference signals—(1) an interference signal relating to a reference provided by calibrator; and (2) an interference signal relating to a property of the target. Combination (e.g., comparison) of the two interference signals may be used to determine a property of the target (e.g., a distance). In some examples, the two interference signals described may be generated using separate components, while in some examples shared components may be used to generate both interference signals.

Properties of any of a variety of targets may be measured in accordance with examples described herein. Targets, such as target 132 of FIG. 1, may generally be any object and/or surface. Example targets may include automobiles, signs, people, trees, buildings, optical surfaces, etc. Targets may be stationary or may be moving. A variety of properties of the target may be measured in accordance with examples described herein, including a distance between the target and the transceiver (or other portion of the system used to illuminate the target).

Figure 2:
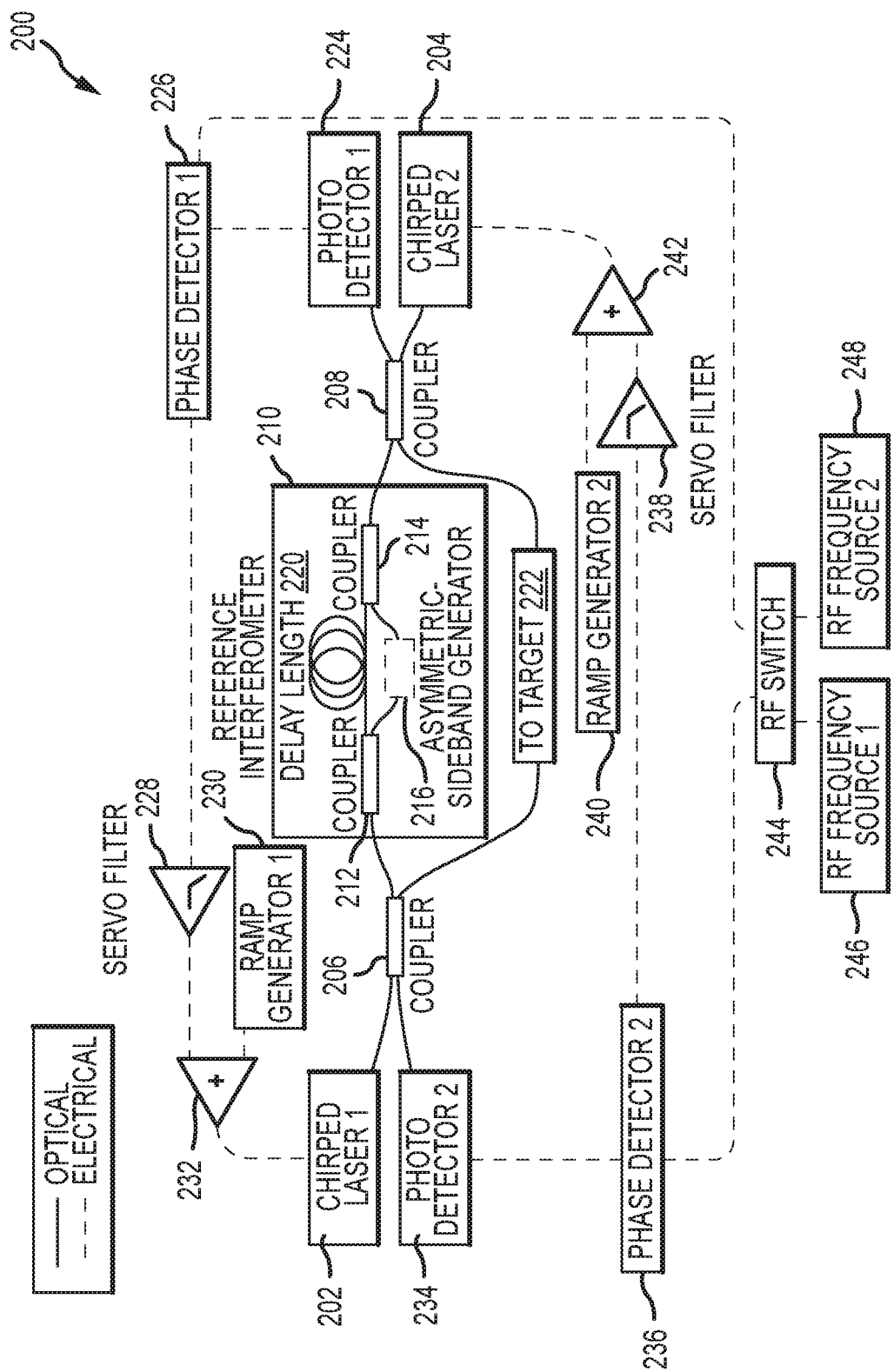
FIG. 2 is a schematic illustration of a system arranged in accordance with examples described herein.

FIG. 2 is a schematic illustration of a system arranged in accordance with examples described herein. The system 200 may be used to implement and/or may be implemented using variations of the system 100 of FIG. 1. The system 200 includes chirped laser 202, chirped laser 204, coupler 206, coupler 208, reference interferometer 210, target 222, photo detector 224, phase detector 226, servo filter 228, ramp generator 230, combiner 232, photo detector 234, phase detector 236, servo filter 238, ramp generator 240, combiner 242, RF switch 244, RF frequency source 246, and RF frequency source 248. The reference interferometer 210 may include coupler 212, coupler 214, asymmetric-sideband generator 216, and delay length 220. Additional, fewer, and/or different components may be used in other examples. The chirped laser 202, coupler 206, reference interferometer 210, coupler 208, photo detector 224, phase detector 226, servo filter 228, ramp generator 230, and combiner 232 may form a feedback loop to control the chirped laser 202. The chirped laser 204, coupler 208, reference interferometer 210, coupler 206, photo detector 234, phase detector 236, servo filter 238, ramp generator 240, and combiner 242 may form a feedback loop to control the chirped laser 204.

The example of FIG. 2 illustrates an example where multiple (e.g., 2) chirped lasers (e.g., chirped laser 202 and chirped laser 204) may share certain components in the feedback loop(s) used to control the chirped lasers. For example, the reference interferometer 210 may be used in the feedback loop used to control chirped laser 202 and in the feedback loop used to control chirped laser 204. Additionally, the coupler 206 and coupler 208 may be used in multiple feedback loops.

Laser output from chirped laser 202 may be split into two portions by coupler 206. Similarly, laser output from chirped laser 204 may be split into two portions by coupler 208. A first split portion from the coupler 206 may be directed toward target 222 and/or other components. A second split portion from the coupler 206 may be directed to reference interferometer 210. A first split portion from the coupler 208 may be directed toward target 222 and/or other components. A second split portion from the coupler 208 may be directed to reference interferometer 210.

The reference interferometer 210 may include coupler 212 which may receive laser light from coupler 206 and split the beam received from coupler 206 into multiple optical paths (two are shown in FIG. 2). A first optical path split from coupler 212 may include delay length 220. A second optical path split from coupler 212 may include asymmetric-sideband generator 216. In other examples, the asymmetric-sideband generator 216 may not be used and a fiber or other element may be used to connect coupler 212 and coupler 214. Light from multiple optical paths may be received and combined at coupler 214. Similarly, coupler 214 may receive laser light from coupler 208 and split the beam into multiple optical paths (two are shown in FIG. 2). A first optical path split from coupler 218 may include delay length 220. A second optical path split from coupler 218 may include asymmetric-sideband generator 216. In other examples, the asymmetric-sideband generator 216 may not be used and a fiber or other element may be used to connect coupler 212 and coupler 214. Light from multiple optical paths may be received and combined at coupler 212.

Note that input laser light from the chirped laser 204 may traverse the same optical components of the reference interferometer 210 as the input laser light from the chirped laser 202, but in the opposite direction (e.g. counterpropagating). In this manner, only one set of reference interferometer components may be necessary—e.g., the same components may be used to transmit light from chirped laser 202 and chirped laser 204, with the light moving in opposite directions through the components.

Laser light exiting the reference interferometer from coupler 214 may be directed to coupler 208. A split portion from the coupler 208 may be directed to photo detector 224 to create a first interference signal. The first interference signal may be directed to phase detector 226 to produce a first error signal. The first error signal may be filtered in servo filter 228, which may include a combination of proportional, integral and/or derivative gain components, summed in combiner 232 with an electronic ramp from ramp generator 230, and applied to an actuator of the chirped laser 202 to control the chirped laser 202. Similarly, laser light exiting the reference interferometer from coupler 212 may be directed to coupler 206. A split portion from the coupler 206 may be directed to photo detector 234 to create a second interference signal. The second interference signal may be directed to phase detector 236 to produce a second error signal. The second error signal may be filtered in servo filter 238, which may include a combination of proportional, integral and/or derivative gain components, summed in combiner 242 with an electronic ramp from ramp generator 240, and applied to an actuator of the chirped laser 204 to control the chirped laser 204. The phase detector 226 and phase detector 236 may receive reference RF signals from RF frequency source 246 and/or RF frequency source 248. RF switch 244 may be used to effectively switch between RF signal frequencies, which may be used to switch to different chirp rates in some examples.

The chirped lasers of FIG. 2 (e.g., chirped laser 202 and chirped laser 204) may be implemented using any chirped lasers, including those described with respect to FIG. 1—e.g., with respect to chirped laser 102 and/or chirped laser 112.

The couplers of FIG. 2 (e.g., coupler 206, coupler 208, coupler 212, and/or coupler 214) may be implemented using any coupler and/or splitter. For example, couplers and splitters are described with reference to FIG. 1 (e.g., splitter 116, splitter 118, and/or coupler 120).

A reference interferometer may be used in examples described herein. A reference interferometer may be used in one or more feedback loops. In some examples, one reference interferometer may be used in multiple feedback loops, such as two feedback loops in FIG. 2. Reference interferometers described herein may generally direct light along multiple optical paths of different lengths or the same lengths. Interference generated by combining the light after traversing the multiple optical paths may be used to control the laser chirp.

Examples of reference interferometers may include one or more delay lengths provided in an optical path to increase the transit time of the optical path. Delay lengths described herein, such as delay length 220, may be implemented using one or more fibers or materials that increase the transit time along an optical path.

Accordingly, the reference interferometer 210 of FIG. 2 includes a first optical path including delay length 220 and a second optical path including asymmetric-sideband generator 216. The optical path having the delay length 220 may be a same length or a different length than the optical path having the asymmetric-sideband generator 216. In some example, the asymmetric-sideband generator 216 may not be present, and a fiber and/or a delay length may form a second optical path between the coupler 212 and the coupler 214. Again, the two path lengths may be the same or may be different. The difference in optical transit times between multiple path lengths in reference interferometers described herein may be referred to as $\tau$.

Reference interferometers described herein may be used to receive input laser light from multiple (e.g., 2) chirped lasers. The laser light from different lasers may move through the reference interferometers in different directions (e.g., opposite directions). In this manner, multiple active feedback loops may utilize a shared reference interferometer for each of multiple (e.g., two) chirped lasers while eliminating or reducing cross-talk, or other signal degradation due to the presence of the other laser signal.

The reference interferometer 210 shown in FIG. 2 is a Mach Zender interferometer. However, any type of optical interferometer may generally be used to implement reference interferometer 210 or other reference interferometers described herein.

Examples of photo detectors are described herein, such as photo detector 224 and photo detector 234 of FIG. 2. Generally any photo detector may be used.

Examples of phase detectors are described herein, such as phase detector 226 and phase detector 236 of FIG. 2. While phase detectors are described, it is to be understood that in some examples frequency detectors may additionally or instead be used. In some examples, the phase detectors and/or frequency detectors may be implemented using one or more mixers. Phase detectors described herein may compare a phase and/or frequency of a signal output of a reference interferometer with that of an RF frequency source. The comparison may result in an error signal, which may be provided by the phase and/or frequency detector described herein.

Examples of servo filters are described herein, such as servo filter 228 and servo filter 238 of FIG. 2.

Examples of ramp generators are described herein, such as ramp generator 230 and ramp generator 240 of FIG. 2. Generally, a ramp generator may provide nominal chirp waveforms. For example, if a linear chirp is desired, the ramp generator may provide a linear signal. In other examples, other signal generators may be used to provide the nominal chirp waveform. The nominal chirp waveform may be combined with a filtered error signal to provide an actuator signal to a chirped laser. In some examples, a ramp generator, and/or a nominal chirp waveform, may not be used.

Examples of combiners are described herein, such as combiner 232 and combiner 242 of FIG. 2. Combiners may be implemented using summers, subtractors, multipliers, and/or dividers. In some examples, combiners described herein may combine an error signal (e.g., a filtered error signal) with a nominal chirp signal (e.g., a signal from a ramp or other signal generator) to provide an actuator signal to control a chirped laser.

Examples of RF frequency sources are described herein, such as RF frequency source 246 and RF frequency source 248 of FIG. 2. RF frequency sources may be implemented using one or more oscillators. Switches, such as RF switches (e.g., RF switch 244) may be used to switch between multiple RF frequency sources. Different chirp rates may be achieved in some examples by selecting different RF frequency sources.

Examples described herein may accordingly include an asymmetric-sideband generator (e.g., asymmetric-sideband generator 216 of FIG. 2) in one or more feedback loops used to control a chirped laser described herein. The asymmetric-sideband generator may be an asymmetric-sideband phase modulator and/or an asymmetric-sideband amplitude modulator.

Generally, an asymmetric sideband modulator that may be used within a reference interferometer of an active feedback loop may be implemented using an electro-optic modulator, such as an optical single-sideband modulator, that produces a modulation sideband on one side of a carrier frequency that is larger than the modulation sideband that is equally spaced from the carrier frequency, but on the opposite side of the carrier frequency.

Figure 3:
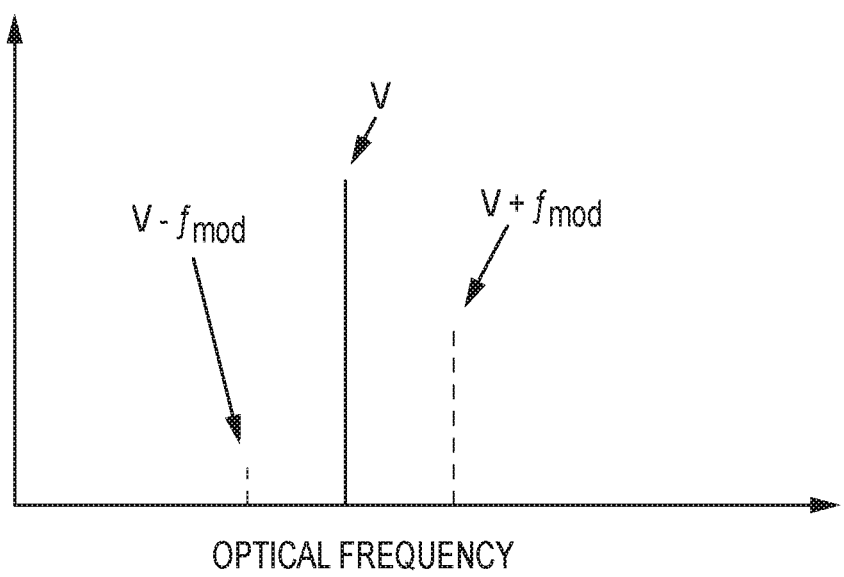
FIG. 3 is a graph of an example output spectrum of an asymmetric-sideband generator arranged in accordance with examples described herein.

FIG. 3 is a graph of an example output spectrum of an asymmetric-sideband generator arranged in accordance with examples described herein. FIG. 3 shows an example optical spectrum that may be produced by inputting a laser frequency v into an asymmetric-sideband generator. In this example, the first upper sideband at frequency $v+f_{mod}$ is larger in amplitude than the first lower sideband at frequency $v+f_{mod}$, where $f_{mod}$ is the sideband modulation frequency. In some examples, the asymmetry in sideband amplitude may be present in sidebands other than or in addition to the first sidebands (e.g., in the second, third, and/or fourth sidebands). In some cases, the carrier frequency peak at v may be suppressed, which may leave a single predominant sideband.

Figure 4:
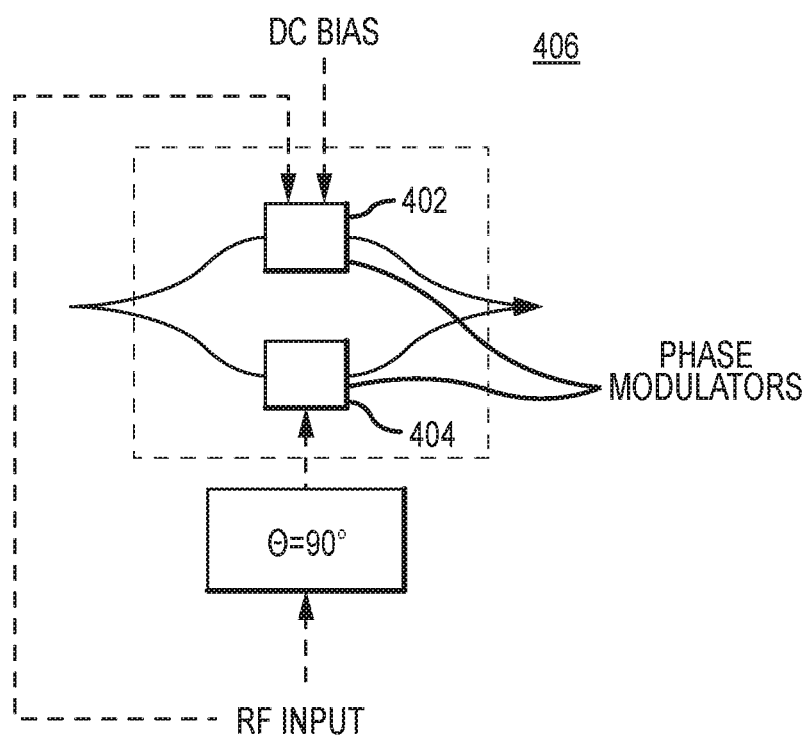
FIG. 4 is a schematic illustration of an asymmetric-sideband generator arranged in accordance with examples described herein.

FIG. 4 is a schematic illustration of an asymmetric-sideband generator arranged in accordance with examples described herein. The asymmetric-sideband generator 406 may be used to implement and/or may be implemented by the asymmetric-sideband generator 216 of FIG. 2. The asymmetric-sideband generator 406 includes phase modulator 402 and phase modulator 404.

Asymmetric-sideband generators described herein, such as asymmetric-sideband generator 406, may be implemented wholly or partially using one or more photonic integrated circuits (PICs). PICs may include, for example, planar lightwave circuit(s), integrated optical circuit(s), and/or integrated optoelectronic device(s). PICs generally may integrate multiple photonic components or functions at a semiconductor chip level, and as such may be similar to an electronic integrated circuit.

Utilizing an asymmetric-sideband generator in a reference interferometer of a feedback loop may facilitate increased closed-loop bandwidth for the feedback loop. Referring back to FIG. 2, for example, if the asymmetric-sideband generator 216 is omitted, the interference signal produced at the photo detector 224 may oscillate at a frequency of $f_{beat}=\kappa\tau$, where $\kappa$ is the chirp rate of chirped laser 202 and $\tau$ is the transit time difference between the two optical paths of the reference interferometer. However, the closed-loop bandwidth of the active feedback loop, $\Delta f$, may be limited by the condition that $\Delta f \ll \kappa\tau$. The chirp rate, $\kappa$, and/or optical pathlength difference, $\tau$, may be sufficiently small that the closed-loop active feedback bandwidth is undesirably low. By adding an asymmetric-sideband generator within the reference interferometer, the interference signal produced at the photodetector 224 of FIG. 2 may oscillate at a frequency of $f_{beat}=\kappa\tau+f_{mod}$ (or $f_{beat}=f_{mod}-\kappa\tau$) where it is understood that $f_{mod}$ may refer to any harmonic of the modulation frequency. Now the closed-loop bandwidth of the active feedback loop, $\Delta f$, may be limited by the less-stringent condition that $\Delta f \ll \kappa\tau+f_{mod}$. In this case, $f_{mod}$ may be made large enough to accommodate the desired closed-loop active feedback bandwidth.

By utilizing PIC components, the round-trip time delay of the feedback loop may be reduced, thereby facilitating greater closed-loop active feedback bandwidths in some examples. Finally, for some applications where cost is a significant factor, PIC components may offer considerable cost reductions compared to bulk optical components.

In some examples, systems described herein may wholly and/or partially increase a coherence length of a laser beam provided by a chirped laser to an actual coherence length which is longer than the free-running coherence length of the laser. The coherence length of a chirped laser may relate to range measurements of a target obtainable with sufficient signal-to-noise ratio (SNR) or range resolution for a given purpose. In some examples, the coherence length of a chirped laser source as source 106 and/or source 110 of FIG. 1) may be insufficient to obtain a desired measurement with suitable SNR. Insufficient SNR or degraded range resolution may be due to inadequate coherence length or stochastic fluctuations in the laser frequency during the frequency chirp in some examples. The SNR may be range dependent (e.g., the SNR may increase with increasing target range). Example data from a chirped laser with degraded SNR and/or resolution at long range is shown in FIG. 5a and FIG. 5b. FIG. 5b is a zoomed view of the range region near the range peaks from FIG. 5a. FIG. 5a and FIG. 5b each show three range profiles (e.g. target signal strength versus range) on logarithmic vertical scales, labeled trace 502, trace 506, and trace 510, which may be obtained through a fast Fourier transform of detected interference signals, corresponding to a target range of about 2.2 kilometers. Trace 502 in FIG. 5a and FIG. 5b represents the range profile resulting from a highly linear chirp where chirp nonlinearities may have been removed and/or reduced that may be associated with a nonlinear optical frequency response to an actuator signal. However, the distance to the target is greater than the free-running coherence length of the laser, and no coherent range peak is evident (e.g., SNR <1). The free-running coherence length of the laser may be given by $l_{coh}=c/(\pi\Delta v)$, where c is the speed of light and $\Delta v$ is the free-running linewidth of the laser in the absence of the feedback loop and without chirping the frequency. In this and other examples, the free-running linewidth of the laser may be at or near the Schawlow-Townes linewidth limit, which may be given by $\Delta v=\pi hv(\Delta v_c)^2/P_{out}$, where hv is the photon energy, $\Delta v_c$ is the laser resonator bandwidth, and $P_{out}$ is the laser output power. Trace 506 represents data from the same chirped laser but with sufficiently high closed-loop active feedback bandwidth to produce a narrow coherent range peak on the broad incoherent peak that may be used for precision range measurements. Finally, trace 510 represents the same chirped laser, this time with an even greater closed-loop active feedback bandwidth to produce an even stronger coherent range peak for even more precise or longer-range measurements. In order to appreciably increase the coherent range peak in this manner, and facilitate longer-range, more precise range measurements during frequency chirping, sufficiently high-bandwidth active electronic feedback as described herein may be used. The production of a narrow coherent range peak even though the target is beyond the free-running laser coherence length demonstrates that sufficiently high closed-loop active feedback bandwidth may result in increased coherence length (e.g., actual coherence length) beyond the free-running laser coherence length of the laser. In fact, the traces show that the actual coherence length may be increased beyond the coherence length determined by the Schawlow-Townes linewidth limit by use of sufficiently high-bandwidth active electronic feedback. At a minimum the closed-loop feedback bandwidth may be designed to exceed the repetition rate of the chirp sequence if the chirp is repeated in time. Also, to increase the actual coherence length greater than the free-running coherence length, the closed-loop active feedback bandwidth may be designed to exceed 10% of the free-running laser linewidth. By way of example, if the laser free-running linewidth is 1 MHz, the closed-loop active feedback bandwidth may be designed to exceed 100 kHz. A metric that the closed-loop bandwidth is sufficiently high to increase the coherence length is that, for a target distance beyond the free-running laser coherence length, a coherent range peak is produced. By using high-bandwidth closed-loop electronic feedback in this way, the laser coherence length, and therefore the precision and/or range obtainable from FMCW measurements, may be increased.

Some examples described herein may include a calibrator. There may be a desire to accurately calibrate the measurement of a parameter of a target (e.g., distance to the target). Referring to the example of FIG. 1, a portion of the actively linearized chirp outputs from chirped laser 102 and/or chirped laser 112 may be combined in a coupler 120 to form a combined beam. The combined beam may be split, with a first portion directed to calibrator 126, which may be used to determine a chirp rate or reference length of one or both laser outputs. A second portion may be directed to a transceiver 130 that may transmit light to and receive light from a target. Optical circulators may be positioned in the paths to direct the combined beam to the calibration module and transceiver, and to direct light returned from the calibration module and transceiver to the photodetectors and signal processors.

Figure 6:
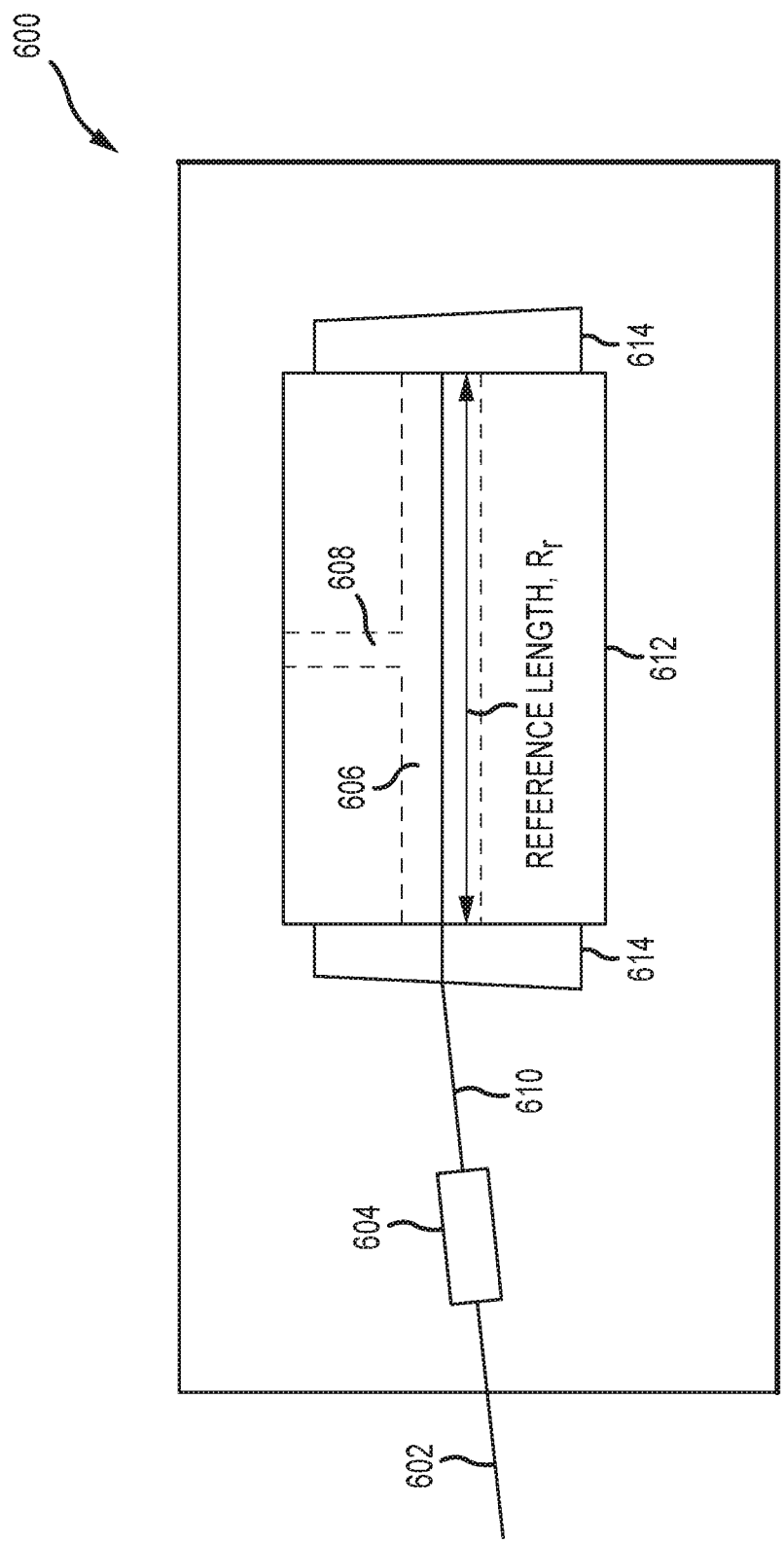
FIG. 6 is a schematic illustration of a calibrator arranged in accordance with examples described herein.

FIG. 6 is a schematic illustration of a calibrator arranged in accordance with examples described herein. The calibrator 600 may be used to implement the calibrator 126 of FIG. 1 in some examples. The calibrator 600 includes fiber 602, beam collimator 604, cavity 606, vent 608, laser beam 610, spacer material 612, and windows 614. Additional, fewer, and/or different components may be used in other examples. The windows 614 may be wedged and may be disposed on either end of spacer material 612. The spacer material 612 may wholly and/or partially define cavity 606 through the spacer material 612 between the windows 614. The spacer material 612 may wholly and/or partially define vent 608 in fluid communication with cavity 606. A vent may also be realized by other mechanisms such as not hermetically sealing one or more windows 614. The fiber 602 and beam collimator 604 may collimate and direct laser beam 610 through the cavity 606.

Examples of calibrators described herein may accordingly include two reflective surfaces (e.g., windows 614). The reflective surfaces may be partially reflective and/or scattering surfaces in some examples. The reflective surfaces are separated by a spacer (e.g., spacer material 612). The reflective surfaces may be aligned to retro-reflect a portion of the light beam passing through interfaces (e.g., air-glass interfaces) at the ends of the spacer. The reflective surfaces may be attached to the spacer to maintain alignment of the reflections to the laser beam, and to maintain a constant distance between reflective surfaces with low sensitivity to temperature.

Examples of calibrators described herein may include a spacer (e.g., spacer material 612). The spacer may be made of, for example, ultra-low expansion (ULE) glass material. The spacer may wholly and/or partially define a cavity, such as cavity 606. The cavity may allow a laser beam to pass through the spacer without entering the spacer material. The cavity may be hollow (e.g., devoid of spacer material) and in some examples may be filled with air, vacuum, and/or any other gas. In some examples, a vent (e.g., vent 608) may be at least partially defined by the spacer. The vent may be in fluid communication with the cavity (e.g., cavity 606). The vent may allow pressure (e.g., air pressure) inside the cavity portion of the spacer to equilibrate with the ambient pressure (e.g. ambient air pressure) at the location of the overall FMCW LiDAR system. In some examples, the air pressure, and hence the group velocity of light, inside the reference length can be made substantially similar to the air pressure and group velocity of light in the optical path between the transceiver and the target being measured (e.g., between partial reflector 131 and target 132 of FIG. 1).

In some examples, a beam collimator (e.g., beam collimator 604) may transmit a collimated beam through the calibrator 600, and receive light reflected from the windows 614 at either end of the spacer material 612. In some examples, a housing may be provided to enclose and/or partially enclose beam collimator 604, spacer material 612 and windows 614. The housing may provide a rigid substrate to which the beam collimator 604 and calibrator 600 may be attached, resulting in low and/or lowered sensitivity of the chirp rate or length reference measurements to vibration. In some examples, the interface between the end of the beam collimator 604 and the air and/or other ambient gas may serve as a first reflective surface (e.g., in addition to or instead of a first one of the windows 614). Accordingly, in some examples, a collimator may be adhered or otherwise attached directly to the spacer. Another wedged window or other reflective surface adhered or attached to the other end of the spacer may provide the second reflection.

The calibrator 600 may be used to determine chirp rates for lasers used to produce laser beam 610 (e.g., chirped laser 102 and/or chirped laser 112 of FIG. 1).

Knowledge of the reference length $R_r$ (e.g., a length of the cavity 606 and/or distance between reflective surfaces such as windows 614) and group velocity of air $v_g$ may be used to make measurements of the laser chirp rate κ in some examples. Laser chirp rate measurements may proceed as follow in some examples: 1) Light retro-reflected from the air-glass interfaces that define the calibration length (e.g., from windows 614) is received by the beam collimator 604. 2) The received beams are directed to a photodetector and signal processor (e.g., detectors and signal processors 128 of FIG. 1) by a circulator (e.g., circulator 122 of FIG. 1) and are combined interferometrically on a photo-detector to form a reference length interference signal. 3) The reference length interference signal may then be digitized and processed to determine the reference length interference signal frequency $f_r$. The chirp rate is related to the determined $f_r$ by the equation:

$$k = \frac{f_r v_g}{2R} \quad \text{Equation 1}$$

In the example calibrator shown in FIG. 6, a vent 608 may allow the air pressure inside the hollowed cavity portion of the spacer to equilibrate with the ambient air pressure at the location of the FMCW LiDAR system. An effective chirp rate κ' may be defined that relates the measured FMCW interference signal frequency to the reference length $R_r$ in the case of zero pressure (e.g. $V_g$=c, where c is the vacuum speed of light) using the equation:

$$k' = \frac{f_r c}{2R_r} \quad \text{Equation 2}$$

The effective chirp rate measured using the reference length can then be used to compute the zero-pressure optical path length from the transceiver to the target $R_m$ for a single laser chirp using the equation:

$$R_m = \frac{f_m c}{2k'} \quad \text{Equation 3}$$

where $f_m$ is the determined frequency of the target interference signal that may be formed by combining beams reflected by the target (e.g., target 132) and by a local oscillator surface inside the transceiver (e.g., transceiver 130). Using this approach, the distance between the transceiver and target may be measured without a need for a direct pressure measurement, and with low sensitivity to pressure. Alternatively, the temperature, pressure, gas concentration and/or humidity may be measured near the optical path length from the transceiver to the target $R_m$ and may also be measured near the calibrator. Accordingly, one or more temperature, pressure, gas concentration, and/or humidity sensors may be provided near the calibrator 600 of FIG. 1 and temperature, pressure, gas concentration, and/or humidity sensors may be provided near the optical path between the transceiver 130 and the target 132 of FIG. 1. The measured environmental parameters may be used to more accurately determine the physical distance to the target, $R_m$ in some examples. For example, the measured environmental parameters may be used to compute the group index of refraction (ng) near the reference path $n_{gr}$ and near the measurement path $n_{gm}$. The computed group index values may then be used to more accurately determine Rm using the equation:

$$R_m = \frac{f_m c}{2k'} \frac{n_{gr}}{n_{gm}}. \quad \text{Equation 4}$$

It may also be possible to compute the difference between the group index near the calibrator and measurement paths ($\Delta n_{grm}$) to reduce and/or suppress uncertainty in the environmental parameter measurements, and thereby more accurately determine $R_m$ in some examples. Using this method, the computed group index values may be used to determine $R_m$ using the equation:

$$R_m = \frac{f_m c}{2k'} \frac{n_{gr}}{n_{gr} + \Delta n_{grm}} \quad \text{Equation 5}$$

Accordingly, a vent may not be used and/or provided in the calibrator in some examples.

Figure 7A:
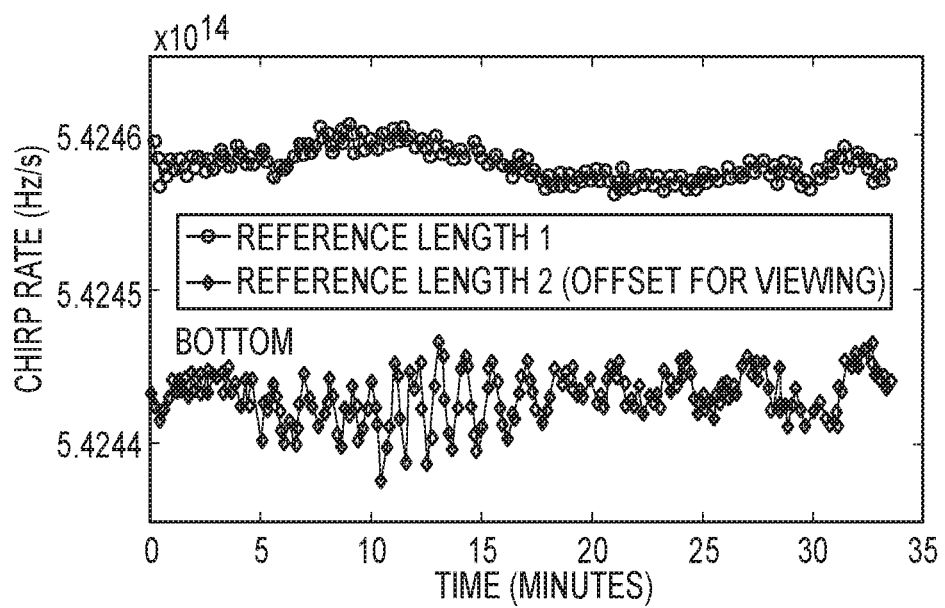
FIG. 7A and FIG. 7B illustrate example data collected from a calibrator arranged in accordance with examples described herein.
Figure 7B:
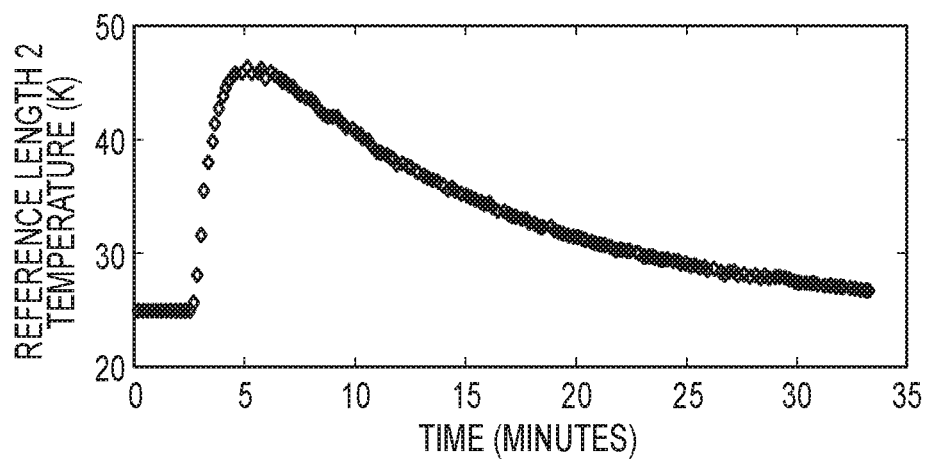

FIG. 7A and FIG. 7B illustrate example data collected from a calibrator arranged in accordance with examples described herein. For example, the calibrator 600 of FIG. 6 may be used to generate the data shown in FIG. 7A and FIG. 7B. FIG. 7A illustrates chirp rate over time. The top trace in FIG. 7A (circles) shows the chirp rate determined from one reference length (e.g., one calibrator) over time while the bottom trace in FIG. 7A (diamonds) shows the chirp rate determined from a second reference length (e.g., a second calibrator) over time. During these measurements, a temperature change was imparted to the second reference length as shown by FIG. 7B. FIG. 7B illustrates temperature over time as applied to the second reference length. Even for the peak temperature change of +20 C, measured chirp rates of the two reference lengths stayed consistent to within about 10 parts per million as shown in FIG. 7A.

Some examples of calibrators may use a sealed reference length (e.g. without a vent) to maintain a constant pressure (vacuum or otherwise) inside the cavity within the spacer. Accurate measurements of the distance between the transceiver and target may advantageously utilize a measurement of the pressure, and may also utilize measurements of the temperature and relative concentrations of gases making up the environment (e.g., air) in the measurement path. The pressure, temperature and/or gas concentration measurements may then be used to compute the group velocity ($v_g$) of the air between the transceiver and the target. The distance between the transceiver and target may be computed from the measured FMCW interference signal frequency according to the equation $$R_m = \frac{f_m v_g}{2k} \quad \text{Equation 6}$$

FIG. 8 is a schematic illustration of detectors and signal processors arranged in accordance with examples described herein. The components shown in FIG. 8 may be used to implement all or portions of detectors and signal processors 128 of FIG. 1, for example. FIG. 8 includes photodetector 802, photodetector 804, switch 806, digitizer 808, and processor 810. Additional, fewer, and/or different components may be used in other examples.

One or more calibration signals (e.g., one or more reference length interference signals) may be provided from a calibrator described herein to the photodetector 802. One or more target interference signals (e.g. Distance signals) may be provided, e.g., from a transceiver described herein, to the photodetector 804. The switch 806 may be used to direct either an output of the photodetector 802 and/or photodetector 804 to digitizer 808, which may digitize the outputs of both photodetectors. The digitized outputs may be further processed by processor 810 to convert the digitized interference signal(s) to calibrated measurement(s) of a property of a target (e.g., distance to a target).

Accordingly, interference signals from one or more lasers may be detected for calibration on a first detector e.g., photodetector 802) and for the target distance on a second detector (e.g., photodetector 804). The detected interference signals from the calibrator and from the distance may be input into a switch, which may alternately select either the detected calibrator or distance signal for digitization and processing. Some examples may utilize a single digitizer and processor, for example when the measurements are conducted in series. However, if interference signals from multiple lasers are used, then the digitizer bandwidth may need to be shared between the detected signals that result from the multiple lasers.

Figure 9:
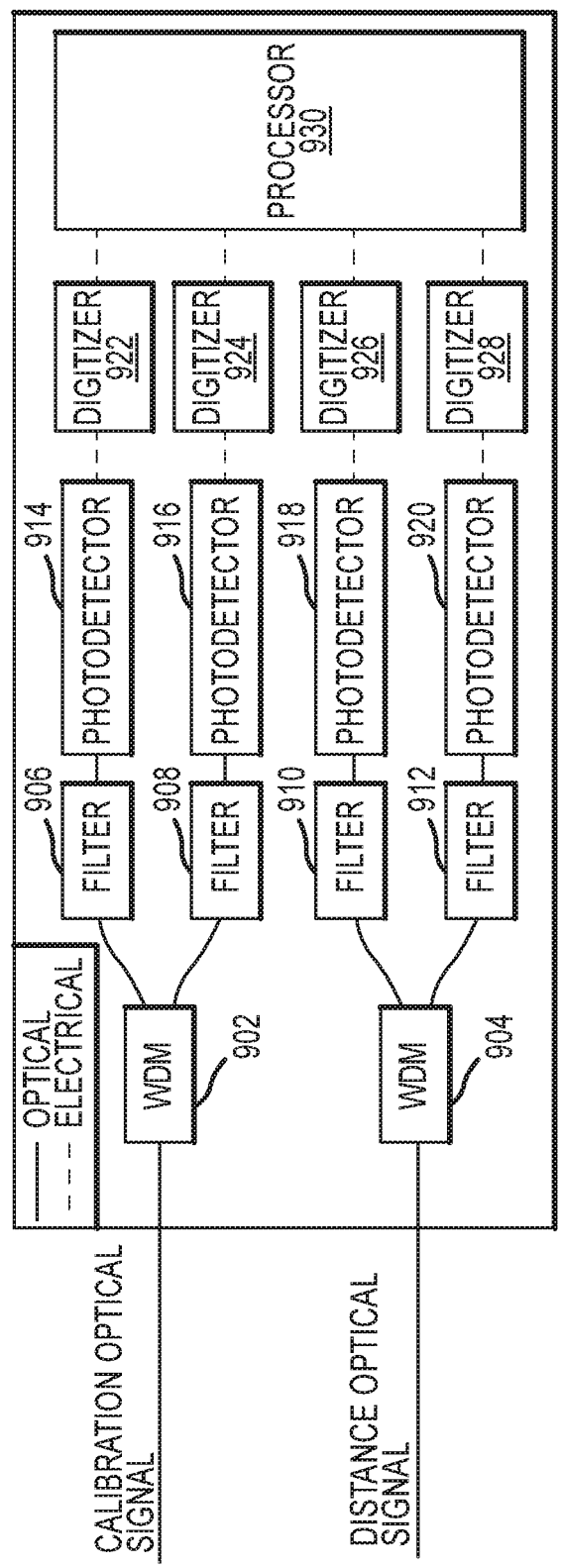
FIG. 9 is a schematic illustration of detectors and signal processors arranged in accordance with examples described herein.

FIG. 9 is a schematic illustration of detectors and signal processors arranged in accordance with examples described herein. The components of FIG. 9 may be used to implement, for example, detectors and signal processors 128 of FIG. 1. FIG. 9 includes wavelength division multiplexer (WDM) 902, WDM 904, filter 906, filter 908, filter 910, filter 912, photodetector 914, photodetector 916, photodetector 918, photodetector 920 digitizer 922, digitizer 924, digitizer 926, digitizer 928, and processor 930. Additional, fewer, and/or different components may be used in other examples.

A calibration signal (e.g., a reference length interference signal) may be provided from a calibrator to WDM 902. A target interference signal (e.g., a distance signal) may be provided from a transceiver to WDM 904. The WDM 902 and WDM 904 may optically separate and isolate their respective signals, which may originate from lasers at different frequencies. While WDMs are shown, other frequency-selective devices may be used, such as Fabry-Perot filters.

Spectrally separated interference signal portions are detected on separate photodetectors and digitized with separate digitizers. For example, WDM 902 is coupled to two sets of filters, photodetectors, and digitizers. WDM 902 may direct a first signal to filter 906 which may filter the signal and provide it to photodetector 914 for detection, then to digitizer 922 for digitization. WDM 902 may direct a second signal to filter 908 which may filter the signal and provide it to photodetector 916 for detection, then to digitizer 924 for digitization. The first path (e.g., filter 906, photodetector 914, digitizer 922) may detect and digitize one spectral portion of the signal (e.g., from one laser), while the second path (e.g., filter 908, photodetector 916, digitizer 924) may detect and digitize a different spectral portion (e.g. from another laser). Similarly, WDM 904 may direct a first signal to filter 910 which may filter the signal and provide it to photodetector 918 for detection, then to digitizer 926 for digitization. WDM 904 may direct a second signal to filter 912 which may filter the signal and provide it to photodetector 920 for detection, then to digitizer 928 for digitization. The first path (e.g., filter 910, photodetector 918, digitizer 926) may detect and digitize one spectral portion of the signal, while the second path (e.g., filter 912, photodetector 920, digitizer 928) may detect and digitize a different spectral portion.

Processor 930 may receive multiple digitized interference signals (e.g., from digitizer 922, digitizer 924, digitizer 926, and digitizer 928) and process them into a calibrated measurement of a property of a target (e.g., a distance to a target).

In this manner, interference signals from multiple lasers may be spectrally separated by a first wavelength division multiplexer for signals from a calibrator and by a second wavelength division multiplexer for signals from a target (e.g., distance signals). The purpose of the wavelength division multiplexers may be to spectrally separate the interference signal contributions from different lasers. The separated contributions may be optically filtered to further suppress residual contributions from unwanted lasers. The interference signals may then be detected using photodetectors, digitized, and/or processed. Some examples may have the advantage of separating the interference signal contributions from different lasers to avoid systematic range measurement errors caused by overlapping interference signals. This configuration may also facilitate simultaneous calibration and distance measurements. Multiple digitizers may be used in this configuration.

Figure 10:
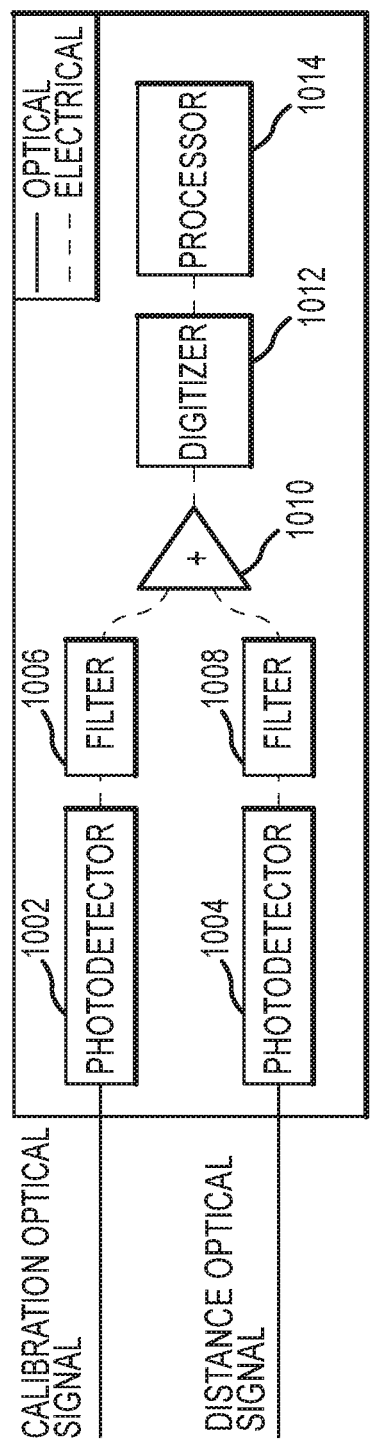
FIG. 10 is a schematic illustration of detectors and signal processors arranged in accordance with examples described herein.

FIG. 10 is a schematic illustration of detectors and signal processors arranged in accordance with examples described herein. The components of FIG. 10 may be used to implement detectors and signal processors 128 of FIG. 1 in some examples. FIG. 10 includes photodetector 1002, photodetector 1004, filter 1006, filter 1008, combiner 1010, digitizer 1012, and processor 1014. Additional, fewer, and/or different components may be used in other examples.

One or more calibration signals (e.g., reference length interference signals) may be detected by photodetector 1002. One or more target interference signals (e.g., distance signals) are detected by photodetector 1004.

The photodetector 1002 is coupled to filter 1006. The photodetector 1004 is coupled to filter 1008. The filter 1006 and filter 1008 may be implemented using any of a variety of electronic filters, such as low-pass, high-pass and/or bandpass. For example, the detected calibration and target distance signals may occupy different RF spectral bands and may be band-pass filtered electronically. The filtered signals may be combined by combiner 1010 into a combined electronic signal. The combiner 1010 may be implemented, for example, using a summer. The combined electronic signal may then be provided to digitizer 1012 and digitized. Processor 1014 may convert the digitized interference signals into calibrated measurement(s) of a property of one or more targets (e.g., distance). Examples such as that shown in FIG. 10 may have the advantage that if, for example, the noise floor for the target interference signal is high, it may not corrupt and/or may reduce corruption of the calibration interference signal noise floor, which may be low. This configuration may also have the advantage that only one digitizer and processor may be used.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
    applying an actuator signal to a laser source to provide a laser beam having a frequency and a free-running coherence length; and
    controlling the actuator signal using a feedback loop to control a chirp of the frequency of the laser beam; and
    wherein the feedback loop has a closed-loop bandwidth selected to cause the laser beam to be having an actual coherence length, wherein the actual coherence length is longer than the free-running coherence length, and wherein the closed-loop bandwidth is greater than a free-running laser linewidth of the laser beam divided by 10.

2. The method of claim 1, wherein controlling the actuator signal comprises controlling the actuator signal to chirp the frequency of the laser beam linearly.

3. The method of claim 1, wherein the feedback loop comprises splitting the laser beam into at least two optical paths and generating an interference signal based on the at least two optical paths.

4. The method of claim 1 wherein the actual coherence length is greater than a coherence length determined by a Schawlow Townes linewidth limit of the laser source.

5. A method comprising:
    applying an actuator signal to a laser source to provide a laser beam having a frequency and a free-running coherence length; and
    controlling the actuator signal using a feedback loop to control a chirp of the frequency of the laser beam; and
    wherein the feedback loop has a closed-loop bandwidth selected to cause the laser beam to be having an actual coherence length, wherein the actual coherence length is longer than the free-running coherence length, wherein the feedback loop comprises splitting the laser beam into at least two optical paths and generating an interference signal based on the at least two optical paths, wherein controlling the actuator signal comprises controlling the actuator signal to chirp the frequency at a chirp rate, and wherein the closed-loop bandwidth is greater than one tenth of a product of the chirp rate and a difference between transit times of the at least two optical paths.

\* \* \* \* \*